(12) United States Patent
Jing et al.

(10) Patent No.: US 11,044,600 B2
(45) Date of Patent: Jun. 22, 2021

(54) APPARATUS AND METHOD FOR PERFORMING LOCAL BREAKOUT SERVICE ON USE REQUIPMENT

(71) Applicant: HUAWEI TECHNOLOGIES CO., LTD., Guangdong (CN)

(72) Inventors: Ying Jing, Shanghai (CN); Jianzhong Yao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1 day.

(21) Appl. No.: 16/540,987

(22) Filed: Aug. 14, 2019

(65) Prior Publication Data

US 2019/0373454 A1    Dec. 5, 2019

Related U.S. Application Data

(63) Continuation of application No. PCT/CN2017/073659, filed on Feb. 15, 2017.

(51) Int. Cl.
*H04W 8/26* (2009.01)
*H04W 76/12* (2018.01)
(Continued)

(52) U.S. Cl.
CPC ............. *H04W 8/26* (2013.01); *H04W 8/005* (2013.01); *H04W 8/18* (2013.01); *H04W 76/12* (2018.02)

(58) Field of Classification Search
CPC ....... H04W 8/26; H04W 76/12; H04W 8/005; H04W 8/18; H04W 8/082; H04L 12/4633
See application file for complete search history.

(56) References Cited

U.S. PATENT DOCUMENTS

| 9,723,531 B2 * | 8/2017 | Vesterinen | ............ H04W 36/22 |
| 2010/0234023 A1 * | 9/2010 | Bae | ........................ H04W 76/12 |
| | | | 455/434 |

(Continued)

FOREIGN PATENT DOCUMENTS

| CN | 101106812 A | 1/2008 |
| CN | 101217798 A | 7/2008 |

(Continued)

OTHER PUBLICATIONS

3GPP TR 23.829 V10.0.1 (Oct. 2011), 3rd Generation Partnership Project; Technical Specification Group Services and System Aspects; Local IP Access and Selected IP Traffic Offload (LIPA-SIPTO) (Release 10), Oct. 2011. total 43 pages.

(Continued)

*Primary Examiner* — Tejis Daya
(74) *Attorney, Agent, or Firm* — Womble Bond Dickinson (US) LLP

(57) ABSTRACT

This application provides a data transmission method, a base station, a local breakout controller, a gateway, and a system. The data transmission method includes: receiving, by a base station, LBO service data sent by user equipment, where the LBO service data carries information about an IP address of a first server; receiving, by the base station, a first message sent by an LBO controller, where the first message includes information about a correspondence between the IP address of the first server and an IP address of a gateway, and the gateway is a gateway that forwards the LBO service data to the first server; and sending, by the base station, the LBO service data to the gateway.

15 Claims, 11 Drawing Sheets

(51) Int. Cl.
*H04W 8/00* (2009.01)
*H04W 8/18* (2009.01)

(56) References Cited

U.S. PATENT DOCUMENTS

| | | | |
|---|---|---|---|
| 2011/0176531 A1* | 7/2011 | Rune | H04W 76/22 370/338 |
| 2011/0292896 A1* | 12/2011 | Yeuom | H04W 8/082 370/329 |
| 2012/0046058 A1* | 2/2012 | Vesterinen | H04W 8/082 455/509 |
| 2012/0093074 A1 | 4/2012 | Sairanen et al. | |
| 2012/0108240 A1 | 5/2012 | Liu et al. | |
| 2012/0269162 A1* | 10/2012 | Vesterinen | H04W 12/0602 370/331 |
| 2014/0018067 A1* | 1/2014 | Rajagopalan | H04W 8/20 455/432.1 |
| 2015/0009811 A1* | 1/2015 | Kweon | H04W 40/02 370/230 |
| 2015/0016340 A1 | 1/2015 | Itoh et al. | |
| 2016/0183127 A1 | 6/2016 | Xu et al. | |
| 2016/0344686 A1 | 11/2016 | Guo et al. | |
| 2018/0242385 A1* | 8/2018 | Chandramouli | G08G 1/096775 |

FOREIGN PATENT DOCUMENTS

| | | |
|---|---|---|
| CN | 101252782 A | 8/2008 |
| CN | 101437019 A | 5/2009 |
| CN | 102349350 A | 2/2012 |
| CN | 102369759 A | 3/2012 |
| CN | 102546370 A | 7/2012 |
| CN | 103269278 A | 8/2013 |
| CN | 104023335 A | 9/2014 |
| CN | 104429103 A | 3/2015 |
| CN | 102763486 B | 8/2015 |
| CN | 105075193 A | 11/2015 |
| CN | 106331200 A | 1/2017 |
| EP | 2406987 A2 | 1/2012 |
| EP | 2475142 A1 | 7/2012 |
| EP | 2843889 A1 | 3/2015 |
| WO | WO-2008132163 A1 * 11/2008 ............ H04W 48/17 |
| WO | 2013128513 A1 | 9/2013 |
| WO | WO-2013159638 A1 * 10/2013 ........ H04W 36/0033 |
| WO | 2015028090 A1 | 3/2015 |
| WO | 2016199873 A1 | 12/2016 |

OTHER PUBLICATIONS

Yinghua Ye, et al:"Enabling Local Breakout from eNB in LTE Networks",Jun. 15, 2012,total 6 pages.
Tsunehiko Chiba,:"Implementation and Evaluation of Local Breakout Method for IP-based Femtocell Networks",Oct. 22, 2010,total 6 pages.
Liu Rongduo, Realization of IMS Services Local Breakout in EPC Network. Telecommunications Network Technology, 201906, 5 pages.
Wang Jing et al, 3GPP Mobile Offloading Technology. ZTE Technology Journal, 201306, 4 pages.
3GPP TS 23A02 V14.0.0 (Jun. 2016), 3rd Generation Partnership Project;Technical Specification Group Services and System Aspects;Architecture enhancements for non-3GPP accesses(Release 14), 300 pages.

* cited by examiner

APPARATUS AND METHOD FOR PERFORMING LOCAL BREAKOUT SERVICE ON USE REQUIPMENT

CROSS-REFERENCE TO RELATED APPLICATIONS

This application is a continuation of International Application No. PCT/CN2017/073659, filed on Feb. 15, 2017, the disclosure of which is herein incorporated by reference in its entirety.

TECHNICAL FIELD

Embodiments of application relate to the communications field, and in particular, to a data transmission method, a base station, a local breakout (LBO) controller, a gateway, and a system.

BACKGROUND

With popularization of smartphones, mobile commerce also becomes increasingly mature. OTT (Over The Top) vendors who provide various application services to user equipment (UE) by using the Internet expect to deploy a service gateway in front of a public data network gateway (PGW), and deploy the service gateway from the PGW to a macro base station, to increase benefits of the OTT vendors. For example, using a mobile phone game as an example, a game server at an appropriate location is better selected by interacting with a service gateway close to the user equipment. In this way, a wireless site (such as a base station) has a requirement and a scenario for providing a local service.

In the prior art, a local forwarding service is defined in the 3rd Generation Partnership Project (3GPP) TR 23.829. However, a mobility management entity (MME) needs to be selected, by using an access point name (APN), to be deployed in a core network PGW or a local public data network gateway L-PGW, so that a particular APN needs to be additionally configured for user equipment (UE) based on different services.

However, current UE generally does not support a configuration of a plurality of APNs, and a packet data convergence protocol (PDCP) is activated for a plurality of times, and different APNs need to be set for different applications. Consequently, it is difficult to use and promote an application (APP).

SUMMARY

This application provides a data transmission method, a base station, a local breakout controller, a gateway, and a system, so that LBO service transmission can be performed without performing an additional configuration for UE, thereby resolving a problem that an LBO service cannot be performed because the user equipment does not support a configuration of a plurality of APNs.

An embodiment of this application provides a data transmission method. The method includes:

receiving, by a base station, LBO service data sent by user equipment, where the LBO service data carries information about an Internet protocol (IP) address of a first server; receiving, by the base station, a first message sent by an LBO controller, where the first message includes information about a correspondence between the IP address of the first server and an IP address of a gateway, and the gateway is a gateway that forwards the LBO service data to the first server; and sending, by the base station, the LBO service data to the gateway.

The first server is a local server. To be specific, the first server is a server deployed close to locations of the base station and the user equipment. The gateway is a local gateway and is configured to: establish a data channel to the base station, and forward the LBO service data of the user equipment to the local server.

According to the data transmission method provided in this embodiment of this application, the base station receives the LBO service data sent by the user equipment; determines the gateway that forwards the LBO service data, based on the information about the IP address of the first server carried in the LBO service data and the correspondence between the IP address of the first server and the IP address of the gateway; forwards the LBO service data to the first server by using the determined gateway, so that an LBO service can be performed without performing an additional configuration for the UE. Therefore, a problem that the LBO service cannot be performed because the user equipment does not support a configuration of a plurality of APNs is resolved, thereby flexibly deploying the LBO service without changing the existing 3GPP standard protocol, and facilitating LBO service promotion performed by an operator. In addition, compared with upgrading and reconstructing a central gateway (CGW) to support the LBO service and forward local traffic in the prior art, CGW deployment costs are reduced.

With reference to the first aspect, in a first possible implementation of the first aspect, before the receiving, by the base station, a first message sent by an LBO controller, the method further includes: sending, by the base station, a second message to the LBO controller, where the second message includes the information about the IP address of the first server, identification information of the user equipment, and information about an IP address of the base station, so that the LBO controller sends the first message to the base station based on the second message.

With reference to the first aspect or the first possible implementation of the first aspect, in a second possible implementation of the first aspect, the method may further include: receiving, by the base station, information about an IP address of at least one server that is sent by the LBO controller, where the at least one server includes the first server. After receiving the information about the IP address of the at least one server that is sent by the LBO controller, the base station stores the information, so that the base station obtains, based on the information about the IP address of the first server carried in the LBO service data, the gateway that forwards the LBO service data to the first server. The process may be implemented during networking, or may be repeatedly performed at a period.

With reference to any one of the first aspect or the possible implementations of the first aspect, in a third possible implementation of the first aspect, the method may further include: establishing, by the base station, a first control plane connection to the LBO controller. The control plane connection is establishment of a control channel, used to report and manage information during communication between the base station and the first server.

With reference to any one of the first aspect or the possible implementations of the first aspect, in a fourth possible implementation of the first aspect, the method may further include: receiving, by the base station, a third message sent by the LBO controller, where the third message may include the information about the IP address of the base station, port information of the base station, information about the IP address of the gateway, and port information of the gateway; and establishing, by the base station, a data plane connection to the gateway based on the third message, where the established data plane connection may also be referred to as an established data plane tunnel, used to transmit the LBO service data. In one embodiment, in this embodiment of this application, the third message may be a tunnel establishment notification message.

With reference to any one of the first aspect or the possible implementations of the first aspect, in a fifth possible implementation of the first aspect, the method further includes: sending, by the base station, a fourth message to the LBO controller, where the fourth message includes the information about the IP address of the first server, the identification information of the user equipment, and the information about the IP address of the base station; receiving, by the base station, a fifth message sent by the LBO controller, where the fifth message is used to instruct the base station to delete the information about the correspondence between the IP address of the first server and the IP address of the gateway; and deleting, by the base station, the information about the correspondence between the IP address of the first server and the IP address of the gateway based on the fifth message.

According to a second aspect, an embodiment of this application provides a data transmission method. The method includes: sending, by a local breakout LBO controller, a first message to a base station, where the first message includes information about a correspondence between an Internet protocol IP address of a first server and an Internet protocol IP address of a gateway, the first message is used to transmit LBO service data, and the gateway is a gateway that forwards the LBO service data to the first server, so that when receiving the LBO service data sent by user equipment, the base station determines, based on information about the IP address of the first server carried in the LBO service data and the first message, the gateway that forwards the LBO service data to the first server. Therefore, an LBO service can be performed without performing an additional configuration for the UE, thereby resolving a problem that the LBO service cannot be performed because the user equipment does not support a configuration of a plurality of APNs. The LBO service is flexibly deployed without changing the existing 3GPP standard protocol, and LBO service promotion performed by an operator is facilitated. In addition, compared with upgrading and reconstructing a central gateway CGW to support the LBO service and forward local traffic in the prior art, CGW deployment costs are reduced.

With reference to the second aspect, in a first possible implementation of the second aspect, before the sending, by an LBO controller, a first message to a base station, the method further includes: receiving, by the LBO controller, a second message sent by the base station, where the second message includes at least one of the information about the IP address of the first server, identification information of the user equipment, and information about an IP address of the base station, so that the LBO controller sends the first message to the base station based on the second message.

With reference to the second aspect or the first possible implementation of the second aspect, in a second possible implementation of the second aspect, the method further includes: sending, by the LBO controller, information about an IP address of at least one server to the base station, where the at least one server includes the first server, so that the base station stores the information after receiving the information. In one embodiment, the sending, by the LBO controller, information about an IP address of at least one server to the base station may be implemented during networking, or may be repeatedly performed at a period.

With reference to any one of the second aspect or the possible implementations of the second aspect, in a third possible implementation of the second aspect, the method further includes: establishing, by the LBO controller, a first control plane connection to the base station; and establishing, by the LBO controller, a second control plane connection to the gateway. The control plane connections are a control channel established between the LBO controller and the base station, and a control channel established between the LBO controller and the gateway, to report and manage information during communication between the base station, the gateway, and the server.

With reference to any one of the second aspect or the possible implementations of the second aspect, in a fourth possible implementation of the second aspect, the method may further include: sending, by the LBO controller, a third message to the base station, where the third message includes tunnel information, and the tunnel information includes the information about the Internet protocol IP address of the base station, port information of the base station, information about the IP address of the gateway, and port information of the gateway; sending, by the LBO controller, a fourth message to the gateway, where the fourth message may include the tunnel information, and the third message and the fourth message are used to establish a data plane tunnel between the base station and the gateway. In one embodiment, the third message and the fourth message may be tunnel establishment notification messages separately sent by the LBO controller to the base station and the gateway, to establish a data plane connection between the base station and the gateway, to be specific, establish a data plane tunnel connection between the base station and the gateway. The data plane tunnel is used to transmit the LBO service data.

With reference to the second aspect or the first possible implementation of the second aspect, in a fifth possible implementation of the second aspect, the method further includes: sending, by the LBO controller, a fifth message to the gateway, where the fifth message includes the information about the correspondence between the Internet protocol IP address of the first server and the Internet protocol IP address of the gateway.

With reference to any one of the second aspect or the possible implementations of the second aspect, in a sixth possible implementation of the second aspect, the method further includes: receiving, by the LBO controller, a sixth message sent by the base station, where the sixth message may include at least one of the information about the IP address of the first server, the identification information of the user equipment, and the information about the IP address of the base station; and sending, by the LBO controller, a seventh message to the base station based on the fourth message, where the seventh message is used to instruct to delete the information about the correspondence between the IP address of the first server and the IP address of the gateway, to be specific, instruct the base station to delete the information about the correspondence between the IP address of the first server and the IP address of the gateway. In one embodiment, the seventh message may be deletion information.

With reference to the fifth possible implementation of the second aspect, in a seventh possible implementation of the second aspect, the method further includes: sending, by the LBO controller, an eighth message to the gateway, where the eighth message is used to instruct to delete the information about the correspondence between the IP address of the first server and the IP address of the gateway, to be specific, instruct the gateway to delete the information about the correspondence between the IP address of the first server and the IP address of the gateway.

According to a third aspect, an embodiment of this application provides a data transmission method. The method includes: receiving, by a gateway, local breakout LBO service data sent by a base station, where the LBO service data carries information about an Internet protocol IP address of a first server; and sending, by the gateway, the LBO service data to the first server. When receiving the LBO service data whose target address is the first server and that is sent by the base station, the gateway forwards the LBO service data to the first server. The first server may be referred to as a local server. To be specific, the first server is a server deployed close to user equipment. According to the local breakout data transmission method provided in this embodiment of this application, an LBO service can be performed without performing an additional configuration for the UE, so that a problem that the LBO service cannot be performed because the user equipment does not support a configuration of a plurality of APNs is resolved, thereby flexibly deploying the LBO service without changing the existing 3GPP standard protocol, and facilitating LBO service promotion performed by an operator.

With reference to the third aspect, in a first possible implementation of the third aspect, before the receiving, by a gateway, local breakout LBO service data sent by a base station, the method further includes: establishing, by the gateway, a second control plane connection to a local breakout LBO controller. The second control plane connection is a control channel established between the LBO controller and the gateway, to report and manage information during communication between the base station, the gateway, and the server.

With reference to the third aspect or the first possible implementation of the third aspect, in a second possible implementation of the third aspect, the method further includes: receiving, by the gateway, a first message sent by the local breakout LBO controller, where the first message includes information about an Internet protocol IP address of the base station, port information of the base station, information about an Internet protocol IP address of the gateway, and port information of the gateway; and establishing, by the gateway, a data plane connection to the base station based on the first message. In one embodiment, the first message may be a tunnel establishment notification message.

With reference to any one of the third aspect or the possible implementations of the third aspect, in a third possible implementation of the third aspect, the method further includes: receiving, by the gateway, a second message sent by the local breakout LBO controller, where the second message includes information about a correspondence between the IP address of the first server and the IP address of the gateway.

With reference to the third aspect, in a fourth possible implementation of the third aspect, the method further includes: receiving, by the gateway, a third message sent by the LBO controller, where the third message is used to instruct to delete the information about the correspondence between the IP address of the first server and the IP address of the gateway; and deleting, by the gateway, the information about the correspondence between the IP address of the first server and the IP address of the gateway.

According to a fourth aspect, an embodiment of this application provides a base station. The base station has a function of implementing behaviors of the base station in the foregoing method designs. The function may be implemented by using hardware, or may be implemented by hardware executing corresponding software. The hardware or the software includes one or more modules corresponding to the foregoing function.

According to a fifth aspect, an embodiment of this application provides a local breakout controller. The local breakout controller has a function of implementing behaviors of the controller in the foregoing method designs. The function may be implemented by using hardware, or may be implemented by hardware executing corresponding software. The hardware or the software includes one or more modules corresponding to the foregoing function.

According to a sixth aspect, an embodiment of this application provides a gateway. The gateway has a function of implementing behaviors of the gateway in the foregoing method designs. The function may be implemented by using hardware, or may be implemented by hardware executing corresponding software. The hardware or the software includes one or more modules corresponding to the foregoing function.

According to a seventh aspect, an embodiment of this application provides a base station. The base station includes a radio transceiver, a transmitter, and a receiver. The radio transceiver is configured to support the base station in communicating with user equipment, for example, receiving the data and/or the message sent by the user equipment in the foregoing method. The transmitter is configured to support the base station in sending the data, the information, or the instruction in the foregoing method to another network element or network device, for example, sending LBO service data to a gateway and/or sending information to an LBO controller, and the like. The receiver is configured to support the base station in receiving the data, the information, or the instruction in the foregoing method that is sent by another network element or network device, for example, receiving information sent by an LBO controller and/or receiving LBO service data sent by a gateway, and the like. In a possible design, the base station may further include a processor. The processor is configured to support the base station in performing a corresponding function in the foregoing method, for example, generating or processing the data and/or signaling information in the foregoing method. In a possible design, the base station may further include a memory. The memory is configured to: couple to the processor and store a program instruction and data that are needed for the base station.

According to an eighth aspect, an embodiment of this application provides a local breakout (LBO) controller. The local breakout controller includes a transmitter. The transmitter is configured to support the local breakout controller in sending the data, the information, or the instruction in the foregoing method to another network element or network device, for example, sending information to a base station and/or a gateway, and the like. In a possible design, the LBO controller may further include a receiver. The receiver is configured to support the LBO controller in receiving the data, the information, or the instruction in the foregoing method that is sent by another network element or network device, for example, receiving information sent by a base station and/or a gateway, and the like. In a possible design, the LBO controller may further include a processor. The processor is configured to support the LBO controller in performing a corresponding function in the foregoing method, for example, generating or processing the data and/or signaling information in the foregoing method. In a possible design, the LBO controller may further include a memory. The memory is configured to: couple to the processor and store a program instruction and data that are needed for the LBO controller.

According to a ninth aspect, an embodiment of this application provides a gateway. The gateway includes a transmitter and a receiver. The transmitter is configured to support the gateway in sending the data, the information, or the instruction in the foregoing method to another network element or network device, for example, sending LBO service data to a server and/or sending information to an LBO controller, and the like. The receiver is configured to support the gateway in receiving the data, the information, or the instruction in the foregoing method that is sent by another network element or network device, for example, receiving LBO service data sent by a base station and/or receiving information sent by an LBO controller, and the like. In a possible design, the gateway may further include a processor. The processor is configured to support the gateway in performing a corresponding function in the foregoing method, for example, receiving or sending the data, the signaling information, and the like in the foregoing method. In a possible design, the gateway may further include a memory. The memory is configured to: couple to the processor and store a program instruction and data that are needed for the gateway.

According to a tenth aspect, an embodiment of this application provides a communications system. The system includes at least one base station according to any one of the seventh aspect or the possible implementations of the seventh aspect, the LBO controller according to any one of the eighth aspect or the possible implementations of the eighth aspect, and the gateway according to any one of the ninth aspect or the possible implementations of the ninth aspect. The at least one base station is configured to provide LBO service access. The LBO controller is configured to manage and configure the at least one base station and the gateway. The gateway is configured to establish a data channel to the base station to bear an LBO service. In a possible design, the communications system further includes at least one first server, configured to provide the LBO service.

According to an eleventh aspect, an embodiment of this application provides a computer storage medium, configured to store a computer software instruction used by the foregoing base station, and the computer storage medium includes a program designed for performing the foregoing aspects.

According to a twelfth aspect, an embodiment of this application provides a computer storage medium, configured to store a computer software instruction used by the foregoing local breakout controller, and the computer storage medium includes a program designed for performing the foregoing aspects.

According to a thirteenth aspect, an embodiment of this application provides a computer storage medium, configured to store a computer software instruction used by the foregoing gateway, and the computer storage medium includes a program designed for performing the foregoing aspects.

According to the data transmission method, the base station, the LBO controller, the gateway, and the system provided in the embodiments of this application, the base station determines the gateway that forwards the LBO service data to the first server, based on the information about the correspondence between the IP address of the first server and the IP address of the gateway that is sent by the LBO controller, the received LBO service data sent by the user equipment, and the information about the IP address of the first server carried in the LBO service data, thereby flexibly deploying the LBO service without needing to configure a plurality of APNs for the user equipment based on different services, and facilitating LBO service promotion.

DESCRIPTION OF EMBODIMENTS

This application provides a data transmission method, a base station, a local breakout controller, a gateway, and a system. In this application, a local breakout (LBO) controller and a local gateway (LGW) are configured in an existing communications network system, and the LGW and at least one base station such as an evolved NodeB (eNodeB) are controlled and managed by using the LBO controller. The base station establishes a local tunnel to the LGW, to provide an LBO service and support switching of the LBO service between the at least one base station.

In embodiments of this application, the local breakout LBO controller may also be referred to as an LBO control node. The local gateway LGW may also be referred to as an LGW node. It should be noted that a controller mentioned in the following descriptions is the LBO controller, and a gateway is the LGW.

In this application, the base station may include a macro base station, a micro base station, a relay node, an access point, a remote radio unit (RRU), or the like in various forms. Certainly, another network side device having a wireless communication function may alternatively wirelessly communicate with user equipment. This is not uniquely limited in this application. In systems using different wireless access technologies, names of devices having a function of the base station may be different. For example, in an LTE network, the device is referred to as an evolved NodeB (eNB or eNodeB); and in a 3G (the 3rd Generation) network, the device is referred to as a NodeB.

The technical solutions in the embodiments of this application are described below with reference to the accompanying drawings in the embodiments of this application.

It should be noted that sequence numbers "first", "second", "third", "fourth", "fifth", "sixth", and "seventh" mentioned in the following descriptions are used to distinguish between messages, and do not limit the messages.

Figure 1:
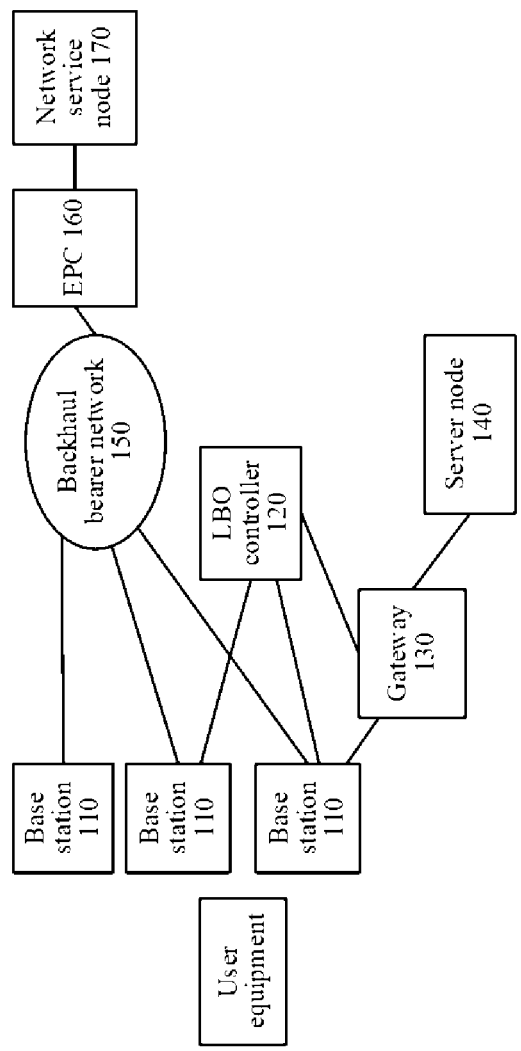
FIG. 1 is a schematic structural diagram of a system according to an embodiment of this application.

FIG. 1 is a schematic structural diagram of a communications system according to an embodiment of this application. As shown in FIG. 1, the communications system includes at least one base station 110, a local breakout LBO controller 120, a gateway 130, a server (Local Server) node 140, a backhaul bearer network 150, an evolved packet core network (EPC) node 160, and a network service node 170.

In this embodiment of this application, the base station 110 may be wirelessly connected to user equipment. The base station 110 may be configured to provide a standard wireless access service. For example, a 4G or 5G base station provides a wireless access service, and may further provide LBO service access.

The LBO controller 120 is configured to manage and configure the base station 110 and the gateway 130. In this embodiment of this application, the LBO controller 120 may be a logical entity, or may be an independent network element, or may be integrated into another network element. For example, the LBO controller 120 may be deployed in the base station 110, or may be independently deployed on a physical server. The LBO controller 120 may be deployed based on an actual networking requirement. This is not limited in this embodiment of this application.

In this embodiment of this application, the LBO controller 120 may be an LBO controller obtained after a quantity of managed base stations is increased through cascade expansion, in other words, a quantity of managed base stations of the LBO controller 120 may be increased through cascade expansion.

The gateway 130 is configured to establish a data channel to the at least one base station 110, to bear LBO service data, for example, to implement encapsulation, decapsulation, a routing function, and the like required for LBO data transmission. In this embodiment of this application, the gateway 130 may be a logical entity, or may be an independent network element, or may be integrated into another network element. For example, the gateway 130 may be deployed on any of the at least one base station 110, or may be independently deployed on a physical server.

The server node 140 is an LBO service server, and an application on the user equipment may communicate with the server. The EPC node 160 provides a standard data channel to the base station 110, and sends data to the network service node 170.

The network service node 170 is a server in a network and is configured to communicate with a server of an application installed in the user equipment.

It should be noted that in this embodiment of this application, the gateway 130 and the server node 140 are a gateway and a server that are deployed close to locations of the user equipment and the base station, and deployment locations of the gateway 130 and the server node 140 are far away from a core network. In this embodiment of this application, the gateway may alternatively be referred to as a local gateway. The server node may alternatively be referred to as a local server node.

In addition, in this embodiment of this application, the system may include a plurality of gateways 130 and a plurality of server nodes 140. The system shown in FIG. 1 is merely used for describing the technical solution of this application, and does not limit a quantity of gateways 130 and a quantity of server nodes 140 that may be included in the system.

Figure 2:
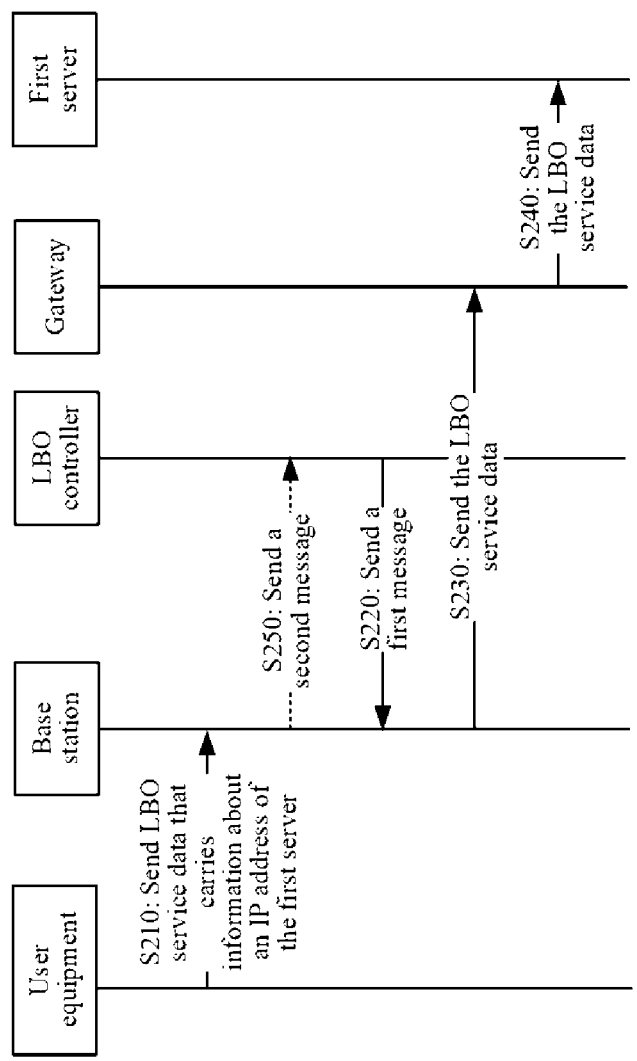
FIG. 2 is a flowchart of a data transmission method according to an embodiment of this application.

FIG. 2 is a flowchart of a data transmission method according to an embodiment of this application. As shown in FIG. 2, the method may include the following operations.

In operation S210, a base station receives local breakout LBO service data sent by user equipment.

The LBO service data carries information about an Internet protocol IP address of a first server. The information about the IP address of the first server is used to indicate the IP address of the first server.

The first server is a target server to which the LBO service data is to be sent. The target server is a server (Local Server) node. To be specific, the target server is a server deployed close to locations of the base station and the user equipment, and deployment locations of the base station and the user equipment are far away from a network element node in a core network.

In operation S220, the base station receives a first message sent by an LBO controller.

The first message includes information about a correspondence between the IP address of the first server and an IP address of a gateway, and the gateway is a gateway that forwards the LBO service data to the first server.

In one embodiment, the information about the correspondence between the IP address of the first server and the IP address of the gateway may be preconfigured for the local breakout LBO controller. Specifically, an LBO controller may be deployed at a near end of the base station, to deploy the communications system shown in FIG. 1. Information about a correspondence between an IP address of a server node and an IP address of a gateway is configured for the LBO controller and is stored. In one embodiment, the LBO controller may store information about an IP address of at least one server, and the at least one server includes the first server.

The LBO controller sends the information about the correspondence between the IP address of the first server and the IP address of the gateway to the base station, so that when receiving the LBO service data sent by the user equipment, the base station determines, based on the information about the IP address of the first server carried in the LBO service data and the information about the correspondence between the IP address of the first server and the IP address of the gateway, the gateway that forwards the LBO service data.

In an embodiment of this application, the LBO controller may alternatively periodically send the first message to the base station. Duration of a specific period may be set based on an actual requirement. This is not limited in this application.

In operation S230, the base station sends the LBO service data to the gateway.

When the base station determines the gateway that forwards the LBO service data to the first server, the base station sends the LBO service data to the gateway.

In operation S240, the gateway sends the LBO service data to the first server.

After receiving the LBO service data sent by the base station, the gateway performs processing such as package and encapsulation on the LBO service data, and forwards the processed LBO service data to the first server, to implement data transmission of the LBO service data.

According to the local breakout data transmission method provided in this embodiment of this application, the base station determines the gateway that forwards the LBO service data to the first server, based on the information about the correspondence between the Internet protocol IP address of the first server and the Internet protocol IP address of the gateway that is sent by the LBO controller, the received LBO service data sent by the user equipment, and the information about the IP address of the first server carried in the LBO service data, thereby flexibly deploying an LBO service without needing to configure a plurality of APNs for the user equipment based on different services. In addition, compared with local traffic forwarding between a remote gateway (RGW) and a center gateway (CGW) in the prior art, deployment costs of the CGW are reduced. The CGW is a gateway for connecting the base station and the core network, and the CGW bears a signaling interface.

In the prior art, user equipment covered by the RGW initiates a local resource request on a default bearer, and the CGW triggers the RGW to establish a dedicated bearer to support an LBO service and forward local traffic. However, the CGW is usually deployed at an aggregation ring of a bearer network, a deployment location is close to a core network and the Internet, and the deployment is heavy and not flexible; in addition, the conventional core network does not support the local breakout LBO service, and the core network needs to be upgraded to support the LBO service. Costs of deploying an existing site to support the LBO service are relatively high, and difficulty in promoting the LBO service by an operator is caused. If the core network is upgraded and reconstructed, the core network needs to temporarily interrupt services. Consequently, normal communication of millions of user equipments for which the core network is responsible is affected, and costs of the upgrade and the reconstruction are high.

In this embodiment of this application, a sequence of S210 and S220 may be interchanged. This is not limited in this embodiment of this application.

In one embodiment, in an embodiment of this application, as shown in FIG. 2, before the receiving, by the base station, a first message sent by an LBO controller, the method may further include:

S250: The base station sends a second message to the LBO controller. The second message includes at least one of the information about the IP address of the first server, identification information of the user equipment, and information about an IP address of the base station.

The identification information of the user equipment may be an IP address of the user equipment, or may be other identification information used to identify user identity.

In one embodiment, after the base station receives the LBO service data sent by the user equipment, the base station first queries whether the first server corresponding to the IP address of the first server carried in the LBO service data and the information about the correspondence between the IP address of the first server and the gateway exist in information about the correspondence between an IP address of a server and an IP address of a gateway. If the information about the correspondence between an IP address of a server and an IP address of a gateway that is stored in the base station does not include the IP address of the gateway corresponding to the IP address of the first server carried in the LBO service data, the base station sends the second message to the LBO controller, to request the LBO controller to send the information about the correspondence between the IP address of the first server and the IP address of the gateway. After receiving the second message sent by the base station, the LBO controller sends the information about the correspondence between the IP address of the first server and the IP address of the gateway to the base station. For example, the information about the IP address of the first server carried in the LBO service data is an IP address of a server 1, and the base station queries the stored information about the correspondence between an IP address of a server and an IP address of a gateway for the IP address of the server 1. If the information about the correspondence between an IP address of a server and an IP address of a gateway that is stored in the base station does not include the IP address of the server 1 and information about a correspondence between the IP address of the server 1 and an IP address of a gateway, the base station sends a request message to the LBO controller, to request the information about the correspondence between the IP address of the server 1 and the IP address of the corresponding gateway. After receiving the request information, the LBO controller sends the information about the correspondence between the IP address of the server 1 and the IP address of the corresponding gateway to the base station, so that the base station determines the gateway that forwards the LBO service data based on the information, and sends the LBO service data.

Figure 3:
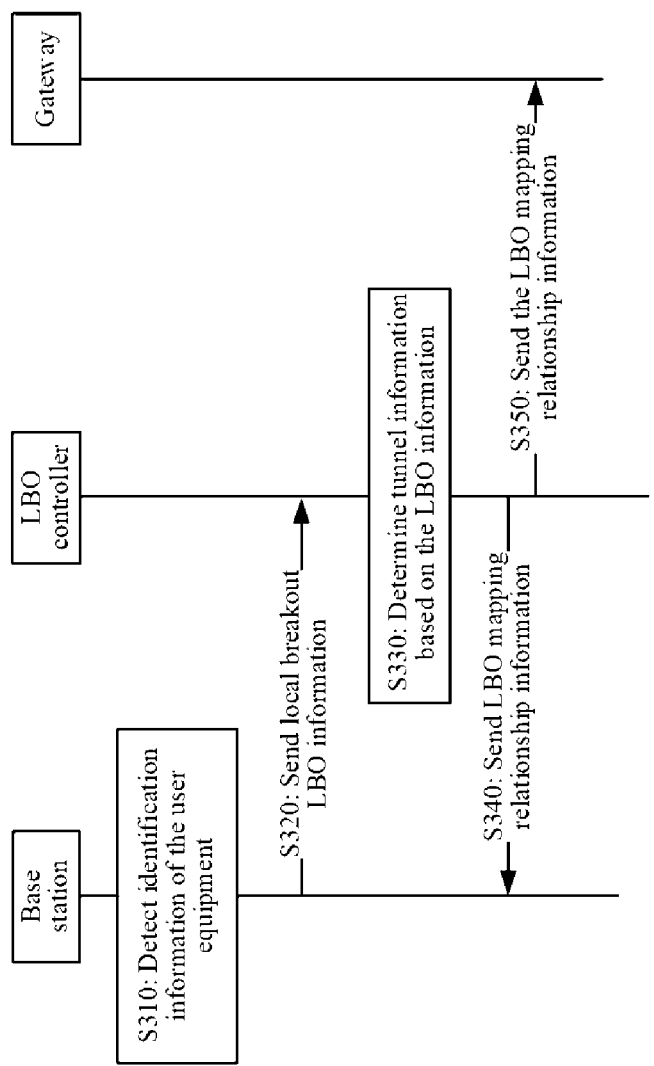
FIG. 3 is a flowchart of another data transmission method according to an embodiment of this application.

The data transmission method provided in this embodiment of this application can be applied to a case in which the user equipment camps on a cell or a case in which the user equipment enters a service range region of a base station from another base station, as shown in FIG. 3.

FIG. 3 is a data transmission method according to an embodiment of this application. The method may include the following operations.

In operation S310, a base station detects identification information of user equipment. The user equipment is user equipment that enters coverage of the base station or user equipment that camps on a cell covered by the base station that can provide an LBO service.

It should be noted that in this embodiment of this application, the user equipment (UE) may be referred to as a terminal, terminal equipment, a mobile station (MS), a mobile terminal, a notebook computer, and the like. The user equipment may communicate with one or more core networks by using a radio access network (RAN). For example, the user equipment may be a mobile phone (or referred to as a "cellular" phone), or a computer having a mobile terminal, or the like. For example, the user equipment may be a portable, pocket-sized, handheld, computer built-in, or in-vehicle mobile apparatus. The user equipment exchanges voice and/or data with the radio access network.

In operation S320, the base station sends local breakout LBO information to an LBO controller.

The LBO information includes the identification information of the user equipment, an IP address of a first server, and an Internet protocol IP address of the base station.

In operation S330, the LBO controller determines tunnel information based on the LBO information.

The tunnel information is configured by the LBO controller during establishment of a data plane connection between the base station and a gateway.

After receiving the LBO information sent by the base station, the LBO controller determines local breakout LBO mapping relationship information based on the LBO information, to be specific, information about a correspondence between the IP address of the first server and an IP address of the gateway. The local breakout LBO mapping relationship information includes information about a correspondence between the LBO information and the tunnel information, to be specific, the LBO controller searches for the tunnel information (including the IP address of the base station, port information of the base station, the IP address of the gateway, and port information of the gateway) corresponding to the IP address of the base station based on the IP address of the base station in the LBO information. In addition, the local breakout LBO mapping relationship information is established, to be specific, a table of the correspondence between the LBO information of the user equipment that enters the base station and the tunnel information.

In operation S340, the LBO controller sends the LBO mapping relationship information to the base station.

In operation S350, the LBO controller sends the LBO mapping relationship information to the gateway.

After separately receiving the LBO mapping relationship information sent by the LBO controller, the base station and the gateway store the LBO mapping relationship information, to facilitate subsequent transmission of LBO service data of the user equipment. In this embodiment, the LBO mapping relationship information corresponds to the information about the correspondence between the IP address of the first server and the IP address of the gateway in the embodiment in FIG. 2, and the first message may include the LBO mapping relationship information.

In another embodiment of this application, the LBO mapping relationship information is first information, or may be referred to as server configuration information. A specific name of the LBO mapping relationship information is not limited in this embodiment of this application.

In an embodiment of this application, the base station receives and stores the LBO mapping relationship information that is sent by the LBO controller and that includes information about an IP address of at least one server.

In an embodiment of this application, the gateway receives and stores the LBO mapping relationship information that is sent by the LBO controller and that includes the information about the IP address of the at least one server. When in a communications system, there is a gateway configured to forward LBO service data sent by a plurality of base stations, and the gateway receives the LBO service data sent by the first server, the gateway forwards the LBO service data to a corresponding base station based on the LBO mapping relationship information, to transmit the LBO service data.

In an embodiment of this application, before transmission of the LBO service data, the method further includes: establishing a control plane connection between the base station and the LBO controller, and a control plane connection between the gateway and the LBO controller, to be specific, establishing a first control plane connection between the LBO controller and the base station, and establishing a second control plane connection between the LBO controller and the gateway. The control plane connection is establishment of a control channel, used to report and manage information during communication between the base station and the first server.

A process of establishing the control plane connection between the base station and the LBO controller, and the control plane connection between the gateway and the LBO controller may be performed during networking. For example, after the networking is implemented and the communications system is powered on, the control plane connection between the base station and the LBO controller, and the control plane connection between the gateway and the LBO controller are established.

Figure 4:
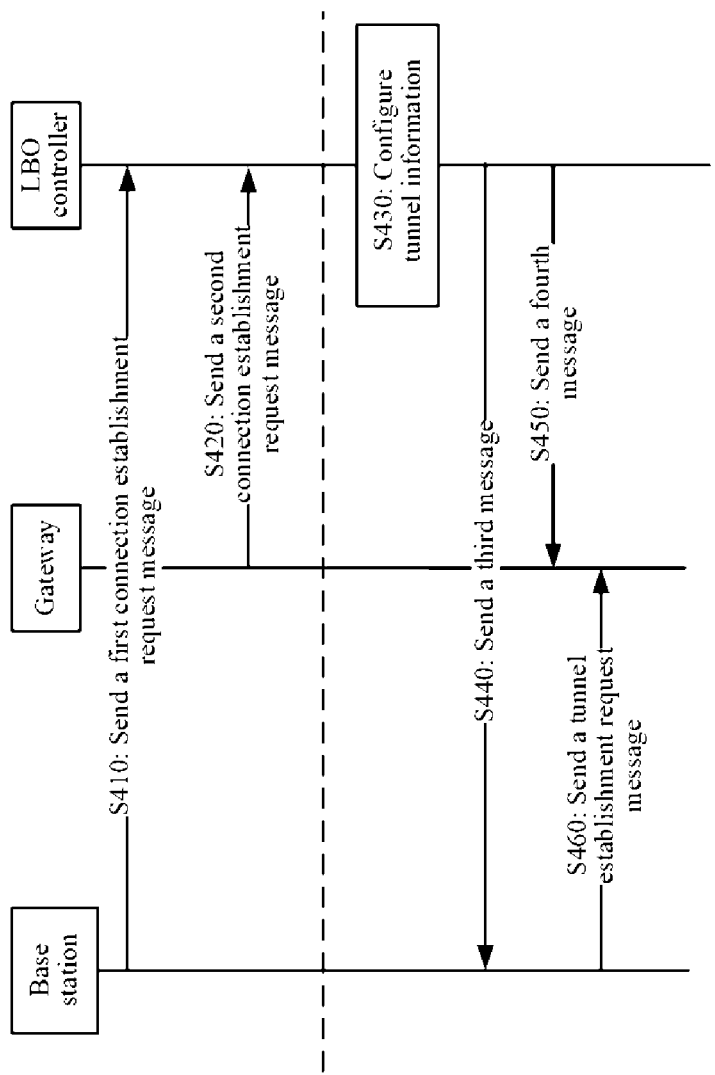
FIG. 4 is a flowchart of another data transmission method according to an embodiment of this application.

In one embodiment, in an embodiment of this application, as shown in FIG. 4, the process of establishing the control plane connection between the base station and the LBO controller, and the control plane connection between the gateway and the LBO controller may include the following operations.

In operation S410, the base station sends a first connection establishment request message to the LBO controller. The first connection establishment request message may include the IP address of the base station, so that the LBO controller performs the control plane connection based on the IP address of the base station.

In one embodiment, in this embodiment of this application, after receiving the first connection establishment request message, the LBO controller may send feedback information to the base station, to instruct the base station to perform the control plane connection to the LBO controller.

In operation S420, the gateway sends a second connection establishment request message to the LBO controller. The second connection establishment request message may include the IP address of the gateway, so that the LBO controller performs the control plane connection based on the IP address of the base station. In this embodiment, the first connection establishment request message and the second connection establishment request message may alternatively have other names. This is not limited in this embodiment of this application.

In one embodiment, in this embodiment of this application, after receiving the second connection establishment request message, the LBO controller may send feedback information to the gateway, to instruct the gateway to perform the control plane connection to the LBO controller.

When an LBO controller and a gateway are deployed at a near end of the base station, the base station and the gateway separately need to establish control plane connections to the LBO controller, in other words, the control plane connection between the base station and the LBO controller and the control plane connection between the gateway and the LBO controller are established.

It should be noted that for that the LBO controller and the gateway are deployed at the near end of the base station, the "near end" herein is a relative concept. From a perspective of a physical distance, the LBO controller, the gateway, and the base station may be deployed in an equipment room, a cell, or a region such as Pudong New District of Shanghai or Chaoyang District of Shanghai. An opposite end "far end" of the "near end" is a physical location close to a core network. Usually, a provincial capital has a set of core networks. The core network is responsible for base station services of several or tens of subordinate cities. For the base station, the core network is deployed at the far end.

It should be noted that in this embodiment, the base station and the gateway may separately establish the control plane connections to the LBO controller by using a protocol such as the user datagram protocol (UDP) or the transmission control protocol (TCP). This is not limited in this embodiment of this application. The IP address may be a control plane IP address, or may include a data plane IP address. This is not limited in this application.

In one embodiment, in an embodiment of this application, as shown in FIG. 4, the method may further include the following operations.

In operation S430, the LBO controller configures the tunnel information.

The tunnel information may include the information about the Internet protocol IP address of the base station, the port information of the base station, the information about the IP address of the gateway, and the port information of the gateway, so that the LBO controller instructs the base station and the gateway to establish a data plane connection, to support LBO data transmission. In one embodiment, in this embodiment, the IP address may be a data plane IP address, or may be a control plane IP address, or may include both a data plane IP address and a control plane IP address.

In operation S440, the LBO controller sends a third message to the base station, to instruct the base station to establish the data plane connection to the gateway.

In operation S450, the LBO controller sends a fourth message to the gateway, to instruct the gateway to establish the data plane connection to the base station.

In this embodiment of this application, each of the third message and the fourth message includes the tunnel information. The third message and the fourth message may alternatively be referred to as tunnel establishment notification messages. Specific names of the third message and the fourth message are not limited in this embodiment of this application.

In one embodiment, in this embodiment, the method may further include:

In operation S460, the base station sends a tunnel establishment request message to the gateway, to establish a data plane tunnel between the base station and the gateway.

In this embodiment of this application, the LBO controller and the gateway are configured in the system, and the control plane connection between the base station and the LBO controller, the control plane connection between the gateway and the LBO controller, and the data plane tunnel between the base station and the gateway are implemented, to bear the LBO service, thereby flexibly deploying the LBO service without changing the existing 3GPP standard protocol, facilitating LBO service promotion performed by an operator, and reducing network deployment costs. In this solution, the base station does not need to be upgraded, a service type (such as an LBO service or an LTE service) of the user equipment does not need to be determined, a plurality of APNs do not need to be set, and a core network EPC does not need to be upgraded to support the LBO service. Compared with that performing an additional APN configuration for the user equipment and upgrading the core network EPC in the prior art, the solution provided in this application has advantages. It is difficult to uniformly configure an LBO function because user equipments of different models and manufactured by different vendors frequently enter the base station, and the upgrading of the core network affects normal communication of millions of user equipments, causing high costs and difficulty in promotion. However, in this solution of this application, only the base station needs to be upgraded, so that an affected range is small; in addition, the upgrading of the base station may be set in the evening (or at night), to reduce the impact to the minimum.

It should be noted that in this embodiment of this application, an LBO controller may be connected to a plurality of base stations, a base station may also be connected to a plurality of gateways, or a gateway may also be connected to a plurality of base stations. When one LBO controller manages a plurality of gateways or a plurality of base stations, the LBO controller sends a tunnel establishment notification message to the plurality of base stations or the plurality of gateways, and the tunnel establishment notification message may include information about the plurality of base stations and information about the plurality of gateways, so that a one-to-many data plane connection is established.

Figure 5:
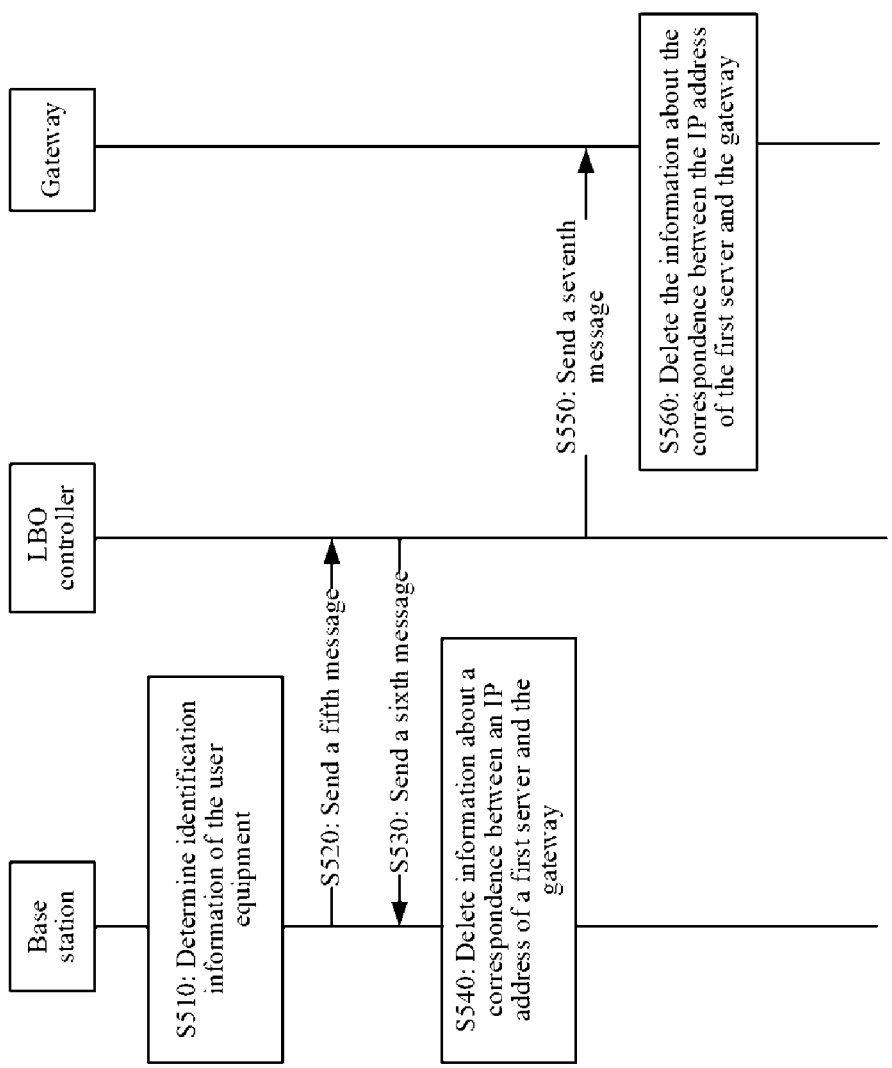
FIG. 5 is a flowchart of still another data transmission method according to an embodiment of this application.

In one embodiment, in this embodiment of this application, as shown in FIG. 5, the method may further include the following operations.

In operation S510, the base station determines the identification information of the user equipment.

In one embodiment, in an embodiment of this application, the user equipment is user equipment that leaves the coverage of the base station. The leaving of the user equipment includes a case in which the user equipment enters a cell covered by another base station or a case in which the user equipment is shut down. The base station deletes an Si bearer of the user equipment that leaves the base station, and actively notifies the LBO controller, to be specific, performs operation S520.

In operation S520, the base station sends a fifth message to the LBO controller. The fifth message includes at least one of the information about the IP address of the first server, the identification information of the user equipment, and the information about the IP address of the base station. The fifth message may be used to notify, when the user equipment leaves the coverage of the base station, the LBO controller of the event, or the fifth message is periodically sent to the LBO controller, to start to delete subsequent related information.

In operation S530, the LBO controller sends a sixth message to the base station. After receiving the notification of the base station, to be specific, receiving the fifth message, the LBO controller sends the sixth message to the base station, to instruct the base station to delete the information about the correspondence between the IP address of the first server and the IP address of the gateway, to be specific, delete the LBO mapping relationship information corresponding to FIG. 3. In one embodiment, the sixth message is used to instruct the base station to delete the information about the correspondence between the IP address of the first server and the IP address of the gateway, and the sixth message may also be referred to as first deletion information.

In operation S540, the base station deletes the information about the correspondence between the IP address of the first server and the IP address of the gateway.

In operation S550, the LBO controller sends a seventh message to the gateway.

In one embodiment, the seventh message may also be referred to as second deletion information. The seventh message also includes at least one of the information about the IP address of the first server, the identification information of the user equipment, and the information about the IP address of the base station, and is used to instruct the gateway to delete the information about the correspondence between the IP address of the first server and the IP address of the gateway.

In operation S560, the gateway deletes the information about the correspondence between the IP address of the first server and the IP address of the gateway.

This embodiment provides a process of processing an LBO service of an original base station when the user equipment is handed over from one base station (the original base station) to another base station (a target base station). For a process of processing an LBO service of the target base station, refer to the embodiments corresponding to FIG. 2 to FIG. 4. For example, when the user equipment enters the target base station, execution of the method/operations S310, S320, S330, S340, and S350 shown in FIG. 3 is triggered. When the user equipment leaves the original base station, execution of the method/operations S510, S520, S530, S540, S550, and S560 shown in FIG. 5 is triggered.

According to the solution provided in this embodiment of this application, the LBO service is flexibly deployed, and LBO service switching is implemented without needing to change the existing 3GPP handover protocol, the additional configuration of the user equipment, and the reconstruction of the core network, and compared with the prior art, the network deployment costs are reduced and deployment efficiency is improved.

The local breakout data transmission method according to the embodiments of this application is described above with reference to FIG. 1 to FIG. 5, and the base station, the LBO controller, and the gateway provided in the embodiments of this application are described below with reference to FIG. 6 to FIG. 11.

Figure 6:
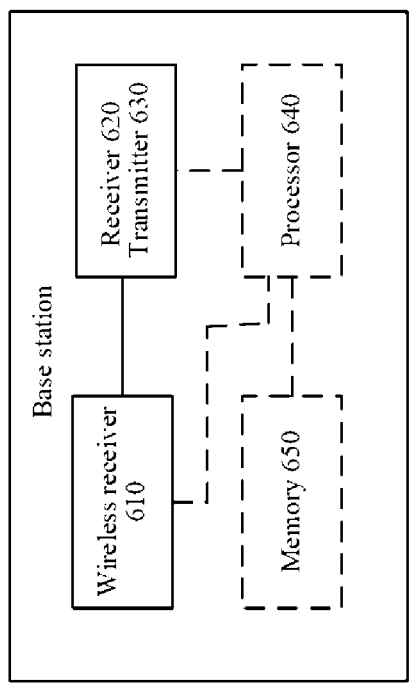
FIG. 6 is a schematic structural diagram of a base station according to an embodiment of this application.

FIG. 6 is a schematic structural diagram of a base station according to an embodiment of this application. The base station has a function of implementing the base station in FIG. 2 to FIG. 5. The function may be implemented by using hardware, or may be implemented by hardware executing corresponding software. The hardware or the software includes one or more units/modules corresponding to the foregoing function.

As shown in FIG. 6, the base station may include a wireless receiver 610, a receiver 620, and a transmitter 630.

The wireless receiver 610 is configured to receive local breakout (LBO) service data sent by user equipment. The LBO service data carries information about an Internet protocol (IP) address of a first server.

The receiver 620 is further configured to receive a first message sent by an LBO controller. The first message includes information about a correspondence between the IP address of the first server and an IP address of a gateway, and the gateway is a gateway that forwards the LBO service data to the first server.

The transmitter 630 is configured to send the LBO service data to the gateway.

The first server is a local server. To be specific, the first server is a server deployed close to locations of the base station and the user equipment. The gateway is a local gateway and is configured to: establish a data channel to the base station, and forward the LBO service data of the user equipment to the local server.

In this embodiment of this application, information about a correspondence between an IP address of a first server and an IP address of a gateway is preconfigured for the LBO controller, and the information about the correspondence may include information about a correspondence between an IP address of at least one first server and an IP address of a gateway. The LBO controller sends the configured information about the correspondence between an IP address of a first server and an IP address of a gateway to the base station, and the base station receives and stores the information about the correspondence between an IP address of a first server and an IP address of a gateway.

In this embodiment of this application, after the base station receives the LBO service data sent by the user equipment, if the information about the correspondence between an IP address of a first server and a gateway that is stored in the base station does not include the gateway corresponding to the information about the IP address of the first server carried in the LBO service data, the base station sends a request to the LBO controller, and the first message may alternatively be the information about the correspondence between the IP address of the first server and the gateway that is sent by the LBO controller to the base station. In this embodiment of this application, if the first message is sent by the LBO controller to the base station after the base station requests for the first message from the LBO controller, the first message may include only the information about the correspondence between the IP address of the first server and the IP address of the gateway that corresponds to the information about the IP address of the first server carried in the LBO service data.

If the receiver 620 receives the LBO service data sent by the user equipment, the base station determines the gateway that forwards the LBO service data, based on the information about the IP address of the first server carried in the LBO service data, and the information about the correspondence between an IP address of a first server and a gateway that is stored in the base station, and sends the LBO service data to the gateway.

It should be noted that in this embodiment of this application, the first message may alternatively be referred to as server configuration information. A specific name of the first message is not limited in this embodiment of this application.

This embodiment of this application provides the base station. For specific descriptions of data transmission performed by the base station, refer to the descriptions S210, S220, and S230 of the data transmission performed by the base station in FIG. 2. For brevity, details are not described herein again.

According to the base station provided in this embodiment of this application, the base station receives the LBO service data sent by the user equipment; determines the gateway that forwards the LBO service data, based on the information about the IP address of the first server carried in the LBO service data and the received correspondence between an IP address of a first server and an IP address of a gateway that is sent by the LBO controller; forwards the LBO service data to the first server by using the determined gateway, so that a problem that the user equipment does not support a configuration of a plurality of APNs and does not support a plurality of times of PDCH activation is resolved, thereby flexibly deploying the LBO service without changing the existing 3GPP standard protocol, and facilitating LBO service promotion performed by an operator.

In one embodiment, in an embodiment of this application, the transmitter 630 is further configured to send a second message to the LBO controller. The second message includes at least one of the information about the IP address of the first server, identification information of the user equipment, and information about an IP address of the base station.

If the receiver 620 receives the LBO service data sent by the user equipment, and the information about the correspondence between an IP address of a first server and an IP address of a gateway that is stored in the base station does not include the information about the IP address of the first server carried in the LBO service data and the information about the correspondence between the IP address of the first server and the IP address of the gateway, the transmitter 630 sends the second message to the LBO controller, to request the LBO controller to send the first message, to be specific, the information about the correspondence between the IP address of the first server and the IP address of the gateway, to the base station. After the receiver 620 receives the information about the correspondence, the transmitter 630 may send an LBO service to the gateway, and the gateway further forwards the LBO service to the first server.

For the base station provided in this embodiment of this application, a described process of data transmission performed by the base station is the same as that in the descriptions of S250 in FIG. 2. For brevity, details are not described herein again.

In one embodiment, in an embodiment of this application, the receiver 620 is further configured to receive information about an IP address of at least one server that is sent by the LBO controller, and the at least one server includes the first server.

Before transmission of the LBO service data between the base station and the gateway, the base station provided in this embodiment of this application needs to be connected to the server nodes, to be specific, devices such as the first server, the LBO controller, and the gateway, in the communications system shown in FIG. 1, and establishes a control plane connection to the LBO controller. The control plane connection is establishment of a control channel, used to report and manage information during communication between the base station and the first server.

In this embodiment of this application, the base station further undertakes a radio signal sending and receiving task. To be specific, the base station sends data to the user equipment or receives data sent by the user equipment. In this embodiment of this application, the transceiver apparatus may be referred to as a wireless receiver and a wireless transmitter. In this embodiment of this application, the receiver 620 and the transmitter 630 in the base station may alternatively be referred to as a communications unit, configured to support the base station in communicating with another network entity, for example, configured to support the base station in communicating with another communications network entity (such as the gateway or the LBO controller) shown in FIG. 1.

In an embodiment of this application, for specific descriptions about establishing, by the base station, the control plane connection to the LBO controller, refer to the descriptions of S410 in FIG. 4. For brevity, details are not described herein again.

In one embodiment, in an embodiment of this application, as shown in FIG. 6, the base station includes a processor 640.

The receiver 620 is further configured to receive a third message sent by the LBO controller. The third message includes the information about the IP address of the base station, port information of the base station, information about the IP address of the gateway, and port information of the gateway.

The processor 640 is configured to establish a data plane connection to the gateway based on the third message.

In this embodiment of this application, the third message may alternatively be referred to as a tunnel establishment notification message. However, this is not limited in this embodiment of this application.

For a specific process of establishing, by the processor 640, the data plane connection to the gateway based on the third message, refer to S440 and S460 in FIG. 4. For brevity, details are not described herein again.

In one embodiment, in an embodiment of this application, the transmitter 630 is further configured to send a fourth message to the LBO controller, where the fourth message includes at least one of the information about the IP address of the first server, the identification information of the user equipment, and the information about the IP address of the base station, and the fourth message is used to instruct the LBO controller to send a fifth message to the base station;

the receiver 620 is further configured to receive the fifth message; and the processor 640 is further configured to delete the information about the correspondence between the IP address of the first server and the IP address of the gateway based on the fifth message.

If the user equipment leaves a cell covered by the base station, the transmitter 630 sends the fourth message to the LBO controller, to notify the LBO controller that the user equipment is not in the cell, so that the LBO controller sends the fifth message to the base station. The fifth message is used to instruct the base station to delete the information about the correspondence between the IP address of the first server corresponding to the user equipment and the IP address of the gateway.

In this embodiment of this application, the fifth message may alternatively be referred to as deletion information. However, a specific name of the fifth message is not limited in this embodiment of this application.

It should be noted that in this embodiment of this application, the fourth message corresponds to the fifth message in S520 in FIG. 5, and the fifth message corresponds to the sixth message in S530 in FIG. 5. For specific descriptions, also refer to S510, S520, S530, and S540 in FIG. 5. For brevity, details are not described herein again.

Figure 7:
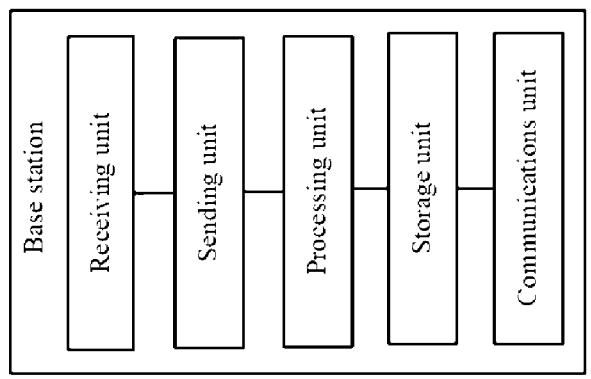
FIG. 7 is a schematic structural diagram of a base station according to an embodiment of this application.

It should be further noted that, the wireless receiver 610, the receiver 620, the transmitter 630, and the processor 640 in the base station provided in this embodiment of this application may alternatively implement, by executing corresponding software, the method/operations performed by the base station in FIG. 2 to FIG. 5. If the method/operations performed by the base station in FIG. 2 to FIG. 5 is implemented by using software, the method/operations performed by the base station in FIG. 2 to FIG. 5 may be implemented by using a corresponding function unit/function module. As shown in FIG. 7, the base station may include a receiving unit, a sending unit, a processing unit, a storage unit, and a communications unit. The receiving unit and the sending unit are configured to wirelessly communicate with the user equipment. The communications unit is configured to communicate with another network element (such as the gateway or the LBO controller), and the like.

In addition, the base station provided in this embodiment of this application may further include a memory 650. The memory 650 is configured to store a program instruction and data that are needed for the base station.

Figure 8:
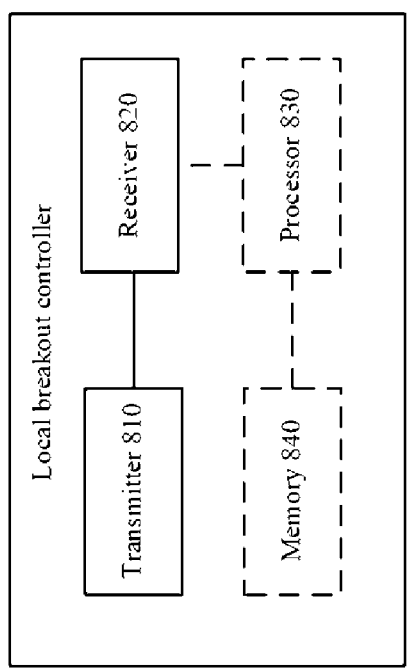
FIG. 8 is a schematic structural diagram of an LBO controller according to an embodiment of this application.

FIG. 8 is a schematic structural diagram of a local breakout controller. The local breakout controller has a function of implementing the local breakout controller in FIG. 2 to FIG. 5. The function may be implemented by using hardware, or may be implemented by hardware executing corresponding software. The hardware or the software includes one or more units/modules corresponding to the foregoing function.

As shown in FIG. 8, the local breakout controller may include a transmitter 810 and a receiver 820.

The transmitter 810 is configured to send a first message to a base station. The first message includes information about a correspondence between an Internet protocol (IP) address of a first server and an Internet protocol IP address of a gateway, the first message is used to transmit LBO service data, and the gateway is a gateway that forwards the LBO service data to the first server.

When receiving the LBO service data sent by user equipment, the base station determines, based on information about the IP address of the first server carried in the LBO service data and the first message, the gateway that forwards the LBO service data to the first server, so that a problem that the user equipment does not support a configuration of a plurality of APNs and does not support a plurality of times of PDCH activation is resolved, thereby flexibly deploying an LBO service without changing the existing 3GPP standard protocol, and facilitating LBO service promotion performed by an operator.

In addition, compared with upgrading and reconstructing a central gateway CGW to support the LBO service and forward local traffic in the prior art, CGW deployment costs are reduced.

The local breakout controller may be referred to as an LBO controller for short. For specific descriptions about sending, by the LBO controller, the first message to the base station, refer to the specific descriptions of S220 in FIG. 2. For brevity, details are not described herein again.

In one embodiment, in an embodiment of this application, the local breakout controller further includes:

the receiver 820 is configured to receive a second message sent by the base station, and the second message includes at least one of information about the IP address of the first server, identification information of the user equipment, and information about an IP address of the base station.

If the base station receives the LBO service data sent by the user equipment, and information about an correspondence between an IP address of first service data and an IP address of a gateway that is stored in the base station does not include the information about the correspondence between the IP address of the first server and the IP address of the gateway that matches the information about the IP address of the first server carried in the LBO service data, the base station sends a second message to the LBO controller, to request the LBO controller to send the information about the correspondence between the IP address of the first server and the gateway that corresponds to the information about the IP address of the first server carried in the LBO service data. The receiver 820 receives the second message sent by the base station, and sends the first message to the base station. The first message includes the information about the correspondence between the IP address of the first server and the IP address of the gateway that is requested by the base station.

In one embodiment, in an embodiment of this application, the transmitter 810 is further configured to send information about an IP address of at least one server to the base station, and the at least one server includes the first server.

Before transmission of the LBO service data between the base station and the gateway, the base station provided in this embodiment of this application needs to be connected to the server nodes, to be specific, devices such as the first server, the LBO controller, and the gateway, in the communications system shown in FIG. 1, and establishes a control plane connection to the base station. The control plane connection is establishment of a control channel, used to report and manage information during communication between the base station and the first server.

In an embodiment of this application, for specific descriptions about establishing, by the LBO controller, the control plane connection to the base station, refer to the descriptions of S410 in FIG. 4. For brevity, details are not described herein again.

In one embodiment, in an embodiment of this application, the transmitter 810 is further configured to send a third message to the base station, the third message includes tunnel information, and the tunnel information includes the information about the Internet protocol IP address of the base station, port information of the base station, information about the IP address of the gateway, and port information of the gateway.

The transmitter 810 is further configured to send a fourth message to the gateway, and the fourth message includes the tunnel information.

The third message and the fourth message are used to establish a data plane tunnel between the base station and the gateway.

For the LBO controller provided in this embodiment of this application, a process of establishing the data plane tunnel between the base station and the gateway is the same as the process of establishing the data plane tunnel between the base station and the gateway in FIG. 4. For specific descriptions, refer to S430, S440, and S450 in FIG. 4. For brevity, details are not described herein again.

In one embodiment, in an embodiment of this application, the transmitter 810 is further configured to send a fifth message to the gateway, and the fifth message includes information about a correspondence between an Internet protocol IP address of a first server and an Internet protocol IP address of a gateway.

In this embodiment of this application, the fifth message may have content the same as content included in the first message in S220 in FIG. 2. The fifth message may alternatively include information about an IP address of at least one server, and the at least one server includes the first server.

The gateway receives and stores LBO mapping relationship information that is sent by the LBO controller and that includes the information about the IP address of the at least one server. When in a communications system, there is a gateway configured to forward LBO service data sent by a plurality of base stations, and the gateway receives the LBO service data sent by the first server, the gateway forwards the LBO service data to a corresponding base station based on the LBO mapping relationship information, to transmit the LBO service data.

In one embodiment, in an embodiment of this application, the receiver 820 is configured to receive a sixth message sent by the base station, and the sixth message includes at least one of the information about the IP address of the first server, the identification information of the user equipment, and the information about the IP address of the base station; and the transmitter 810 is configured to send a seventh message to the base station, and the seventh message is used to instruct to delete the information about the correspondence between the IP address of the first server and the IP address of the gateway.

When the user equipment leaves a cell served by the base station, the base station notifies the LBO controller that the user equipment leaves. After the receiver 820 receives notification information, namely, the sixth message, the transmitter 810 sends a seventh message to the base station, and the seventh message is used to instruct the base station to delete the information about the correspondence between the IP address of the first server corresponding to the user equipment and the IP address of the gateway.

In this embodiment of this application, the seventh message may alternatively be referred to as deletion information. However, a specific name of the seventh message is not limited in this embodiment of this application.

The process performed by the LBO controller provided in this embodiment of this application is the same as the described process of S520 and S530 in FIG. 5. For brevity, refer to S520 and S530 in FIG. 5. However, it needs to be understood that the sixth message in this embodiment of this application corresponds to the fifth message in S520 in FIG. 5, and the seventh message corresponds to the sixth message in S530 in FIG. 5.

In one embodiment, in this embodiment of this application, the transmitter 810 is further configured to send an eighth message to the gateway, and the eighth message is used to instruct to delete the information about the correspondence between the IP address of the first server and the IP address of the gateway.

After receiving the notification message sent by the base station, the receiver 820 of the LBO controller sends the seventh message to the base station, and sends the eighth message to the gateway. Specific descriptions of the process are the same as the described process of S550 in FIG. 5. For details, refer to S550 in FIG. 5. However, it needs to be understood that the eighth message in this embodiment of this application corresponds to the seventh message in S520 in FIG. 5.

Figure 9:
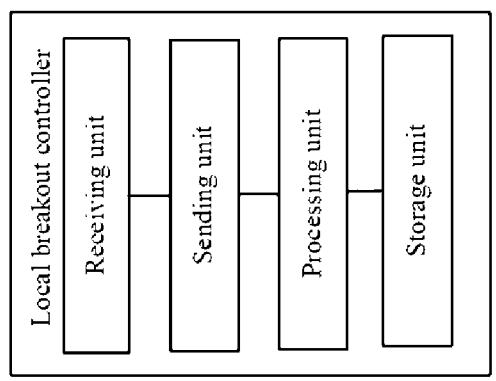
FIG. 9 is a schematic structural diagram of another LBO controller according to an embodiment of this application.

It should be further noted that, the transmitter 810 and the receiver 820 in the local breakout controller provided in this embodiment of this application may alternatively implement, by executing corresponding software, the method/operations performed by the base station in FIG. 2 to FIG. 5. If the method/operations performed by the base station in FIG. 2 to FIG. 5 is implemented by using software, the method/operations performed by the base station in FIG. 2 to FIG. 5 may be implemented by using a corresponding function unit/function module. As shown in FIG. 9, the base station may include a receiving unit, a sending unit, a processing unit, and a storage unit.

In addition, the LBO controller provided in this embodiment of this application may further include a processor 830 and a memory 840. The memory 840 is configured to store a program instruction and data that are needed for the LBO controller. The processor 830 is configured to invoke the instruction in the memory 840 to perform the method operations performed by the LBO controller in FIG. 2 to FIG. 5.

It should be noted that the local breakout controller, serving as a logical entity, may be an independent network element, or may be integrated into the base station. If the local breakout controller is integrated into the base station, specific physical components (such as the transmitter 810 and the receiver 820) of the local breakout controller may be shared by physical components corresponding to the base station, or may be independently used.

Figure 10:
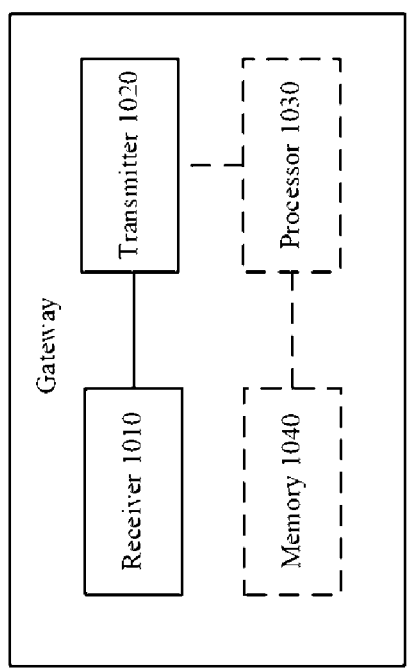
FIG. 10 is a schematic structural diagram of a gateway according to an embodiment of this application.

FIG. 10 is a schematic structural diagram of a gateway. The gateway has a function of implementing the gateway in FIG. 2 to FIG. 5. The function may be implemented by using hardware, or may be implemented by hardware executing corresponding software. The hardware or the software includes one or more units/modules corresponding to the foregoing function.

As shown in FIG. 10, the gateway may include a receiver 1010 and a transmitter 1020.

The receiver 1010 is configured to receive local breakout LBO service data sent by a base station, and the LBO service data carries information about an Internet protocol IP address of a first server.

The transmitter 1020 is configured to send the LBO service data to the first server.

The process is the same as the process of S240 in FIG. 2. For specific descriptions, refer to the descriptions of S240 in FIG. 2. For brevity, details are not described herein again.

According to the local breakout data transmission method provided in this embodiment of this application, a problem that user equipment does not support a configuration of a plurality of APNs and does not support a plurality of times of PDCH activation is resolved, thereby flexibly deploying an LBO service without changing the existing 3GPP standard protocol, and facilitating LBO service promotion performed by an operator.

Before transmission of the LBO service data between the gateway and the base station, a data plane tunnel connection needs to be established between the base station and the gateway.

In one embodiment, in an embodiment of this application, the gateway further includes a processor 1030.

The receiver 1010 is further configured to receive a first message sent by a local breakout LBO controller. The first message includes information about an Internet protocol IP address of the base station, port information of the base station, information about an Internet protocol IP address of the gateway, and port information of the gateway.

The processor 1030 is configured to establish a data plane connection to the base station based on a tunnel establishment notification message.

In this embodiment of this application, the first message may alternatively be referred to as a tunnel establishment notification message. However, a specific name of the first message is not limited in this embodiment of this application.

In an embodiment of this application, the process is the same as the process of S450 and S460 in FIG. 4. For specific descriptions, refer to S450 and S460 in FIG. 4. For brevity, details are not described herein again. It should be noted that the first message in this embodiment of this application corresponds to the fourth message in S450 in FIG. 4.

In one embodiment, in an embodiment of this application, the receiver 1010 is further configured to receive the first message sent by the local breakout LBO controller, and the first message includes information about a correspondence between the IP address of the first server and the IP address of the gateway.

In one embodiment, in an embodiment of this application, the receiver 1010 is further configured to receive a second message sent by the LBO controller.

The processor 1030 is further configured to delete the first message based on the second message.

The process is similar to that in the descriptions of S550 and S560 in FIG. 5. The second message in this embodiment of this application corresponds to the seventh message in S550 in FIG. 5. For specific descriptions, refer to S550 and S560 in FIG. 5. For brevity, details are not described herein again.

In this embodiment of this application, the second message may also be referred to as a deletion message. However, a specific name of the second message is not limited in this embodiment of this application.

Figure 11:
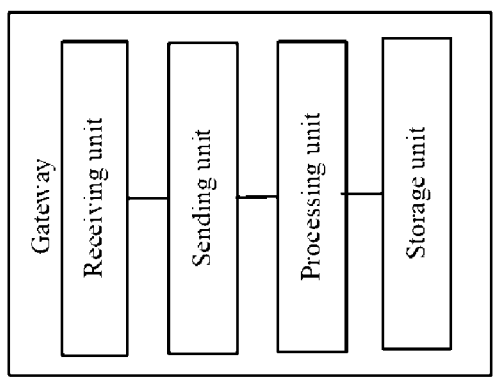
FIG. 11 is a schematic structural diagram of another gateway according to an embodiment of this application.

It should be further noted that, the receiver 1010 and the transmitter 1020 in the gateway provided in this embodiment of this application may alternatively implement, by executing corresponding software, the method/operations performed by the gateway in FIG. 2 to FIG. 5. If the method/operations performed by the gateway in FIG. 2 to FIG. 5 is implemented by using software, the method/operations performed by the gateway in FIG. 2 to FIG. 5 may be implemented by using a corresponding function unit/function module. As shown in FIG. 11, the gateway may include a receiving unit, a sending unit, a processing unit, and a storage unit.

In addition, the LBO controller provided in this embodiment of this application may further include a processor 1030 and a memory 1040. The memory 1040 is configured to store a program instruction and data that are needed for the gateway. The processor 1030 is configured to invoke the instruction in the memory 1040 to perform the method/operations performed by the gateway in FIG. 2 to FIG. 5.

It should be noted that the gateway, serving as a logical entity, may be an independent network element, or may be integrated into the base station. If the gateway is integrated into the base station, specific physical components (such as the receiver 1010, the transmitter 1020, and the processor 1030) of the gateway may be shared by physical components corresponding to the base station, or may be independently used.

An embodiment of this application further provides a communications system. The communications system may include at least one base station shown in FIG. 6, the LBO controller shown in FIG. 8, the gateway shown in FIG. 10, and at least one first server.

The at least one base station is configured to provide LBO service access. The LBO controller is configured to manage and configure the at least one base station and the gateway. The gateway is configured to establish a data channel to the base station to bear an LBO service. The at least one first server is configured to provide the LBO service.

An embodiment of this application provides a computer storage medium, configured to store a computer software instruction used by the foregoing base station, and the computer storage medium includes a program designed for performing the foregoing seventh aspect.

An embodiment of this application provides a computer storage medium, configured to store a computer software instruction used by the foregoing local breakout controller, and the computer storage medium includes a program designed for performing the foregoing eighth aspect.

An embodiment of this application provides a computer storage medium, configured to store a computer software instruction used by the foregoing gateway, and the computer storage medium includes a program designed for performing the foregoing ninth aspect.

It should be understood that, the processor 640/830/1030 in the base station provided in FIG. 6, the local breakout controller provided in FIG. 8, and the gateway provided in FIG. 10 may be a central processing unit (CPU), or may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor or the processor may be any conventional processor, or the like.

In an implementation process, each step of the foregoing method may be implemented by using an integrated logic circuit of hardware in the processor 640/830/1030 or an instruction in a form of software. The operations of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory or electrically erasable programmable memory, or a register. The storage medium is located in the memory, and the processor 640/830/1030 reads information in the memory and implements the operations in the foregoing method in combination with hardware of the processor. To avoid repetition, details are not described herein again.

The memory 650/840/1040 may include a read-only memory and a random access memory, and provides an instruction and data to the processor 640/840/1040. A part of the memory may further include a non-volatile random access memory.

In the several embodiments provided in this application, it should be understood that the disclosed system, base station, local breakout controller, gateway, and data transmission method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces, indirect couplings or communication connections between the apparatuses or units, electrical connections, mechanical connections, or connections in other forms. The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of this application. In addition, the function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving, by a base station, local breakout (LBO) service data sent by user equipment, wherein the LBO service data carries information about an Internet protocol (IP) address of a first server;
   receiving, by the base station, a first message sent by an LBO controller, wherein the first message comprises information about a correspondence between the IP address of the first server and an IP address of a gateway, which forwards the LBO service data to the first server; and sending, by the base station, the LBO service data to the gateway.

2. The method according to claim 1, wherein before the receiving, by the base station, of the first message sent by the LBO controller, the method further comprises:

sending, by the base station, a second message to the LBO controller, wherein the second message comprises at least one of the information about the IP address of the first server, identification information of the user equipment, and information about an IP address of the base station.

3. The method according to claim 1, wherein the method further comprises:

receiving, by the base station, information about an IP address of at least one server that is sent by the LBO controller, wherein the at least one server comprises the first server.

4. The method according to claim 1, wherein the method further comprises:

receiving, by the base station, a third message sent by the LBO controller, wherein the third message comprises the information about the IP address of the base station, port information of the base station, information about the IP address of the gateway, and port information of the gateway; and establishing, by the base station, a data plane connection to the gateway.

5. The method according to claim 1, wherein the method further comprises:

sending, by the base station, a fourth message to the LBO controller, wherein the fourth message comprises at least one of the information about the IP address of the first server, identification information of the user equipment, and the information about the IP address of the base station;

receiving, by the base station, a fifth message sent by the LBO controller, wherein the fifth message is used to instruct the base station to delete the information about the correspondence between the IP address of the first server and the IP address of the gateway; and deleting, by the base station, the information about the correspondence between the IP address of the first server and the IP address of the gateway.

6. A data transmission method, comprising:

sending, by a local breakout (LBO) controller, a first message to a base station, wherein the first message comprises information about a correspondence between an Internet protocol (IP) address of a first server and an IP address of a gateway, wherein the first message is used to transmit LBO service data, and wherein the gateway is a gateway that forwards the LBO service data to the first server.

7. The method according to claim 6, wherein before the sending, by a local breakout controller, of the first message to the base station, the method further comprises:

receiving, by the LBO controller, a second message sent by the base station, wherein the second message comprises at least one of information about the IP address of the first server, identification information of user equipment, and information about an IP address of the base station.

8. The method according to claim 6, wherein the method further comprises:

sending, by the LBO controller, information about an IP address of at least one server to the base station, wherein the at least one server comprises the first server.

9. The method according to claim 6 wherein the method further comprises:

sending, by the LBO controller, a third message to the base station, wherein the third message comprises tunnel information, and the tunnel information comprises the information about the IP address of the base station, port information of the base station, information about the IP address of the gateway, and port information of the gateway;

sending, by the LBO controller, a fourth message to the gateway, wherein the fourth message comprises the tunnel information, and the third message and the fourth message are used to establish a data plane tunnel between the base station and the gateway.

10. The method according to claim 6, wherein the method further comprises:

sending, by the LBO controller, a fifth message to the gateway, wherein the fifth message comprises the information about the correspondence between the IP address of the first server and the IP address of the gateway.

11. The method according to claim 6, wherein the method further comprises:

receiving, by the LBO controller, a sixth message sent by the base station, wherein the sixth message comprises at least one of the information about the IP address of the first server, identification information of user equipment, and the information about the IP address of the base station; and sending, by the LBO controller, a seventh message to the base station, wherein the seventh message is used to instruct to delete the information about the correspondence between the IP address of the first server and the IP address of the gateway.

12. The method according to claim 11, wherein the method further comprises:

sending, by the LBO controller, an eighth message to the gateway, wherein the eighth message is used to instruct to delete the information about the correspondence between the IP address of the first server and the IP address of the gateway.

13. A data transmission method, comprising:

receiving, by a gateway, local breakout (LBO) service data sent by a base station, wherein the LBO service data carries information about an Internet protocol (IP) address of a first server;

sending, by the gateway, the LBO service data to the first server;

receiving, by the gateway, a first message sent by an LBO controller, wherein the first message comprises information about an IP address of the base station, port information of the base station, information about an IP address of the gateway, and port information of the gateway; and establishing, by the gateway, a data plane connection to the base station based on the first message.

14. A data transmission method, comprising:

receiving, by the gateway, local breakout (LBO) service data sent by a base station, wherein the LBO service data carries information about an Internet protocol (IP) address of a first server;

sending, by the gateway, the LBO service data to the first server; and receiving, by the gateway, a second message sent by an LBO controller, wherein the second message comprises information about a correspondence between the IP address of the first server and the IP address of the gateway.

15. The method according to claim 14, wherein the method further comprises:

receiving, by the gateway, a third message sent by the LBO controller, wherein the third message is used to instruct to delete the information about the correspondence between the IP address of the first server and the IP address of the gateway; and deleting, by the gateway, the information about the correspondence between the IP address of the first server and the IP address of the gateway.

\* \* \* \* \*

UNITED STATES PATENT AND TRADEMARK OFFICE
CERTIFICATE OF CORRECTION

PATENT NO. : 11,044,600 B2  
APPLICATION NO. : 16/540987  
DATED : June 22, 2021  
INVENTOR(S) : Jing et al.

Page 1 of 1

It is certified that error appears in the above-identified patent and that said Letters Patent is hereby corrected as shown below:

In the Claims

In Claim 14, Column 28, Line 62, remove "receiving, by the gateway," and insert --receiving, by a gateway,--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*